United States Patent
Stiffler

(10) Patent No.: US 7,742,998 B2
(45) Date of Patent: Jun. 22, 2010

(54) METHOD AND SYSTEM FOR ADMINISTERING COMPLIANCE WITH INTERNATIONAL SHIPPING REQUIREMENTS

(75) Inventor: Mark R. Stiffler, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 3287 days.

(21) Appl. No.: 09/891,163

(22) Filed: Jun. 25, 2001

(65) Prior Publication Data

US 2002/0198752 A1  Dec. 26, 2002

(51) Int. Cl.
G06Q 30/00  (2006.01)

(52) U.S. Cl. .................................. 705/331; 705/334
(58) Field of Classification Search .................. 705/1
See application file for complete search history.

(56) References Cited

U.S. PATENT DOCUMENTS

| | | | |
|---|---|---|---|
| 5,315,508 A | 5/1994 | Bain et al. | |
| 5,485,369 A | 1/1996 | Nicholls et al. | |
| 5,717,989 A | 2/1998 | Tozzoli et al. | |
| 5,878,400 A | 3/1999 | Carter, III | |
| 2002/0023109 A1* | 2/2002 | Lederer et al. | 707/511 |
| 2002/0095355 A1* | 7/2002 | Walker et al. | 705/26 |
| 2002/0120477 A1* | 8/2002 | Jinnett | 705/4 |
| 2002/0184068 A1* | 12/2002 | Krishnan et al. | 705/8 |

FOREIGN PATENT DOCUMENTS

| WO | WO 99/34272 A2 | 7/1999 |
|---|---|---|
| WO | WO 00/42553 A2 | 7/2000 |

OTHER PUBLICATIONS

OpemHarbor In.—Home, Trade Automation for the Global Enterprise, (www.openharbor.com) as archived on Oct. 31, 2001.*
Hjelm, Lars-Erik andMcCarthy, Thomas J, International Electronic Transactions: Ensuring Compliance Wth Customs and International Trade Law, May 2001, Metropolican Corporate Counsel.*

* cited by examiner

Primary Examiner—Jamisue A Plucinski
(74) Attorney, Agent, or Firm—Derek S. Jennings; Anne Vachon Dougherty

(57) ABSTRACT

There are provided methods and systems for facilitating international shipment of goods that enable centralized control of both the establishment of and any changes to international shipping requirements. Users can conveniently query the system through remote terminals. Requirement information is provided in a user-useful and friendly manner including matrices of core requirements relating to all shipments and country specific requirements relating to specified origination and/or destination countries. Compliance testing is provided by which a user can evaluate a particular international shipment for compliance with requirements particular to that shipment.

12 Claims, 16 Drawing Sheets

ADMINISTRATORS AND USERS DATABASE 20

| ACCESS IDENTIFIER | ADMINISTRATOR/USER NAME | ACCESS LEVEL | UPDATE SUBSCRIPTION LIST |
|---|---|---|---|
| PASSWORD | JOHN SMITH | USER | SUBSCRIPTION LIST |
| USERNAME | JANE SMITH | ADMINISTRATOR | SUBSCRIPTION LIST |
| COOKIE ID | ROGER DOE | USER | SUBSCRIPTION LIST |

22 → (ACCESS IDENTIFIER column)
24 → (ADMINISTRATOR/USER NAME column)
26 → 
28A, 28B, 28C, 28D

*Fig. 2*

CORE COMPLIANCE REQUIREMENTS DATABASE 30

| REQUIREMENT IDENTIFIER | SECTION OWNER | SECTION NUMBER | REQUIREMENT DEFINITION | ORIGINATOR OF REQUIREMENT |
|---|---|---|---|---|
| LABELING | JANE SMITH | 01.XXX | GENERAL LABELING REQUIREMENTS | JANE SMITH |
| PACKAGING | JOE SMITH | 02.XXX | GENERAL PACKAGING REQUIREMENTS | JOE SMITH |
| WARNING NOTICES | JANE SMITH | 03.XXX | SPECIFIC WARNING REQUIREMENTS | JANE SMITH |

CORE COMPLIANCE REQUIREMENTS DATABASE 30

| CREATION DATE OF REQUIREMENT | DATE OF LAST UPDATE/ CHANGE | ADMINISTRATOR MAKING LAST CHANGE | REQUIREMENT HISTORY |
|---|---|---|---|
| 01/01/99 | 01/01/99 | JANE SMITH | NONE |
| 01/07/99 | 01/01/99 | JANE SMITH | RECORD OF PREVIOUS UPDATES |
| 02/15/99 | 3/01/00 | JANE SMITH | RECORD OF PREVIOUS UPDATES |

COUNTRY-SPECIFIC REQUIREMENTS DATABASE 40

| COUNTRY | GEOGRAPHY | SECTION OWNER | SECTION NUMBER | REQUIREMENT IDENTIFIER | REQUIREMENT DEFINITION |
|---|---|---|---|---|---|
| HONG KONG | ASIA | JOHN DOE | 01.XXX | LABELING | UNIQUE COLORATION REQUIREMENT |
| FRANCE | EUROPE | JANE DOE | 02.XXX | WARNING LABEL FOR MEDICAL PRODUCTS | SPECIFIC WARNING REQUIRMENT |
| CANADA | NORTH AMERICA | JOHN DOE | 03.XXX | PACAKGING FOR FOOD PRODUCTS | SPECIFIC PACKAGING REQUIREMENTS |

COUNTRY-SPECIFIC REQUIREMENTS DATABASE 40

| ORIGINATOR OF REQUIREMENT | CREATION DATE OF REQUIREMENT | ORIGINATOR OF LAST UPDATE | DATE OF LAST UPDATE | REQUIREMENT HISTORY |
|---|---|---|---|---|
| JOHN DOE | 01/01/99 | JANE DOE | 01/15/01 | HISTORY OF CHANGES & UPDATES |
| JANE DOE | 02/07/99 | JOHN SMITH | 09/01/99 | NONE |
| JOHN DOE | 03/01/99 | JANE SMITH | 06/01/00 | HISTORY OF CHANGES AND UPDATES |

REQUIREMENTS UPDATES DATABASE 50

| REQUIREMENT IDENTIFIER | UPDATED DEFINITION | DATE & ORIGINATOR OF UPDATE | UPDATE STATUS |
|---|---|---|---|
| LABELING: CORE | NEW LABELING REQUIREMENT | 01/15/01: JANE SMITH | TO BE APPROVED |
| PACKAGING: PERISHABLES: AUSTRALIA | NEW PACKAGAING REQUIREMENTS | 02/01/01: JANE SMITH | APPROVED |
| WARNING LABEL: LIVE ANIMALS: MORROCCO | NEW WARNING LABEL REQUIREMENTS | 02//15/01 | REJECTED |

COMPLIANCE TESTING DATABASE 60

| SHIPMENT IDENTIFIER | SHIPMENT TYPE | USER IDENTIFIER | LOCATION IDENTIFIERS | COMPLIANCE REGULATIONS TEST QUESTIONS & ANSWERS | ACTUAL TEST ANSWERS | ACTION PLAN HANDLER |
|---|---|---|---|---|---|---|
| SHIPMENT A | INBOUND | JOHN SMITH | ENTITY, DIVISION, REVIEWER, DATE | RELEVANT QUESTIONS & ANSWERS | LIST OF ANSWERS | JOHN DOE |
| SHIPMENT B | OUTBOUND | ROGER DOE | ENTITY, DIVISION, REVIEWER, DATE | RELEVANT QUESTIONS & ANSWERS | LIST OF ANSWERS | JANE DOE |
| SHIPMENT C | INBOUND | ROGER DOE | ENTITY, DIVISION, REVIEWER, DATE | RELEVANT QUESTIONS & ANSWERS | LIST OF ANSWERS | JOHN DOE |

62 → (row 1), 64 → (row 2), 66 → (row 3)

COUNTRY MATRIX DATABASE 70

| SUMMARY CORE REQUIREMENTS | CORE REFERENCE SECTION | CORE MATRIX TABLE | LEGEND CODES |
|---|---|---|---|
| DOCUMENTATION | 01.XXX | A- COMMERCIAL INVOICE | CODE DESCRIPTION/SECTION REFERENCE |
| PACKING & LABELLING | 02.XXX | B-PALLET INFORMATION | CODE DESCRIPTION/SECTION REFERENCE |
| METHOD OF TRANSPORT | 03.XXX | C-AIR SHIPMENTS | CODE DESCRIPTION/SECTION REFERENCE |

72 → (DOCUMENTATION row)
74 → (PACKING & LABELLING row)
76 → (METHOD OF TRANSPORT row)
78A, 78B, 78C, 78D → column indicators

METHOD AND SYSTEM FOR ADMINISTERING COMPLIANCE WITH INTERNATIONAL SHIPPING REQUIREMENTS

FIELD OF THE INVENTION

The present invention relates generally to systems and methods for administering data in a distributed user environment and more particularly to systems and methods for administering international shipping requirements in a distributed user environment.

BACKGROUND OF THE INVENTION

International shipping requires compliance with extensive, country-specific requirements. Countries may regulate such specifics as: packaging, marking, addressing and a multitude of other factors associated with shipping across jurisdictional borders. Each country has its own, individual set of requirements which may or may not be the same or similar to those of other countries. Failure to comply with shipping requirements may expose a shipper, for example an international company, to extensive fines and/or a moratorium on that company's ability to ship into or out of a particular country. In some instances, failure to comply with shipping requirements may even expose a company to criminal charges.

Various methods and systems are known for facilitating transactions involving the movement of products. U.S. Pat. No. 5,315,508 to Bain et al. Shows a label generating and data tracking system for processing purchase orders. Published international application WO 99/34272 (A2) by Pool et al. Shows a universal shopping center that facilitates international transactions. U.S. Pat. No. 5,485,369 to Nicholls et al. shows a logistics system for automating transportation of goods, while published international application WO 00/42553 (A2) by Harmony Software, Inc. shows a system for processing business information from multiple enterprises.

However, prior to the advent of the present invention, no good method or system was known to applicant for coordinating, distributing and updating the compliance requirements associated with the international shipment of products. In applicant's experience, systems for facilitating compliance with requirements for the international shipment of products suffer from significant drawbacks. In particular, they tend to involve the use of lengthy, often outdated or obsolete, uncontrolled collections of documents and guidelines. Applicant's experience has been that such deficient systems make compliance with international shipping requirements difficult at best and may place organizations, particularly large organizations, at risk for penalties for failure to comply.

It would thus be desirable to provide improved methods and systems for facilitating compliance with international shipping requirements. Such improved methods and systems would be of significant value in assisting organizations, large and small, that ship products across international borders.

SUMMARY OF THE INVENTION

In accordance with the present invention there are provided new and improved methods and systems for facilitating compliance with international shipping requirements. Such methods and systems provide for simplified and controllable development, distribution, updating and testing of compliance with documented requirements in a distributed environment.

In one embodiment of the invention there are provided methods and systems for facilitating international shipping, the method comprising the steps of: storing on the computer core requirements applicable to a plurality of countries; storing on the computer respective country-specific requirements applicable to respective countries; receiving a request for requirements for a selected country; determining if country-specific requirements are stored on the computer for the selected country; providing the core requirements to the requester; and providing, if country-specific requirements are stored on the computer for the country, the country-specific requirements to the requester.

Further provided are methods and systems for: obtaining international shipping requirements, managing requirements to facilitate international shipping, testing compliance of international shipments with requirements, providing a test for comparing the compliance of an international shipment with requirements, and distributing requirements in summary form to facilitate the compliance of international shipments with requirements.

BRIEF DESCRIPTION OF THE DRAWING FIGURES

These and other object, features and advantages of the invention will become apparent from a consideration of the following Detailed Description of the Invention, in which:

FIG. 2 is a table illustrating an exemplary data structure and contents for an administrators and users database;

Figure 6B:
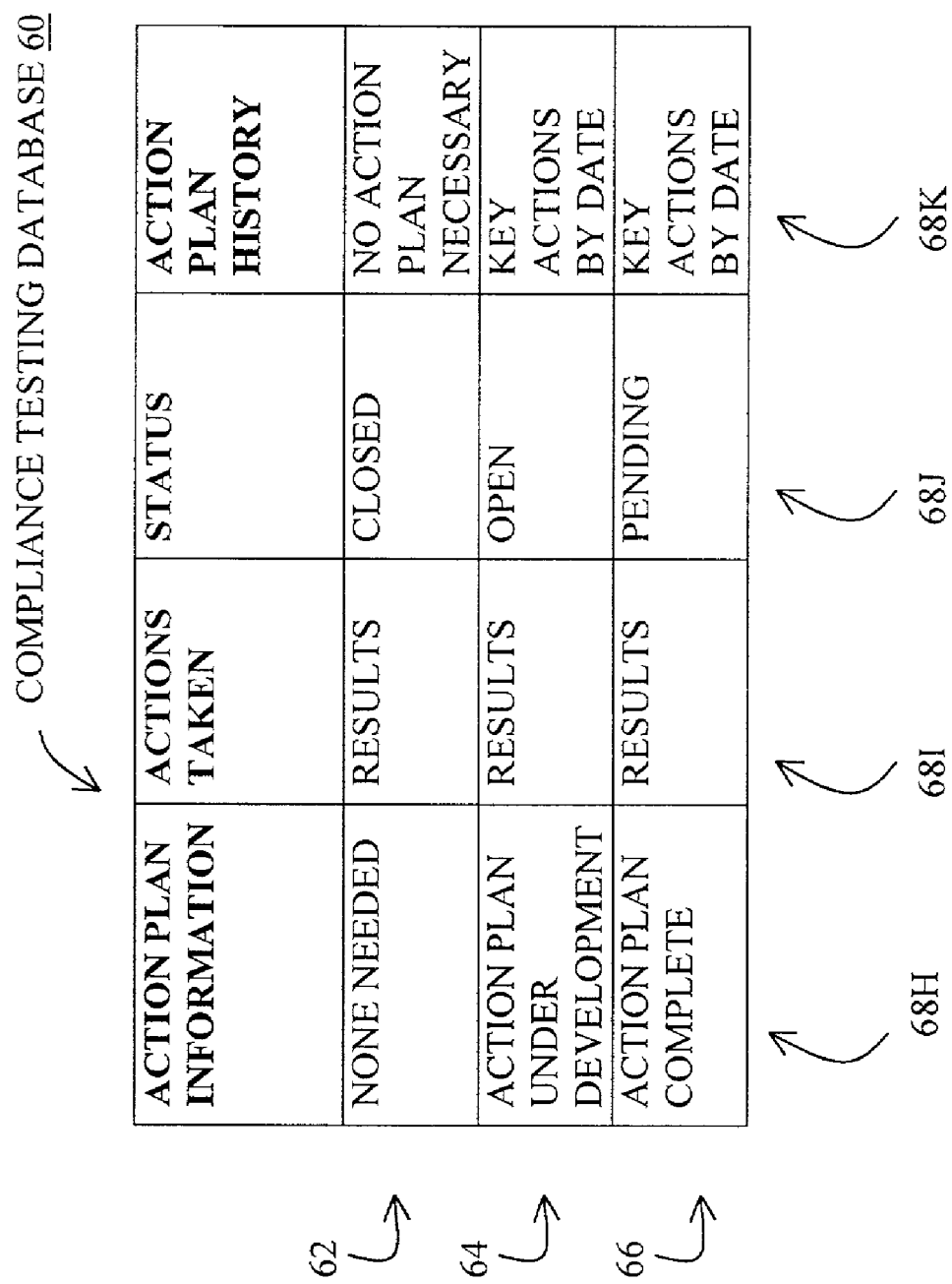
Figure 8:
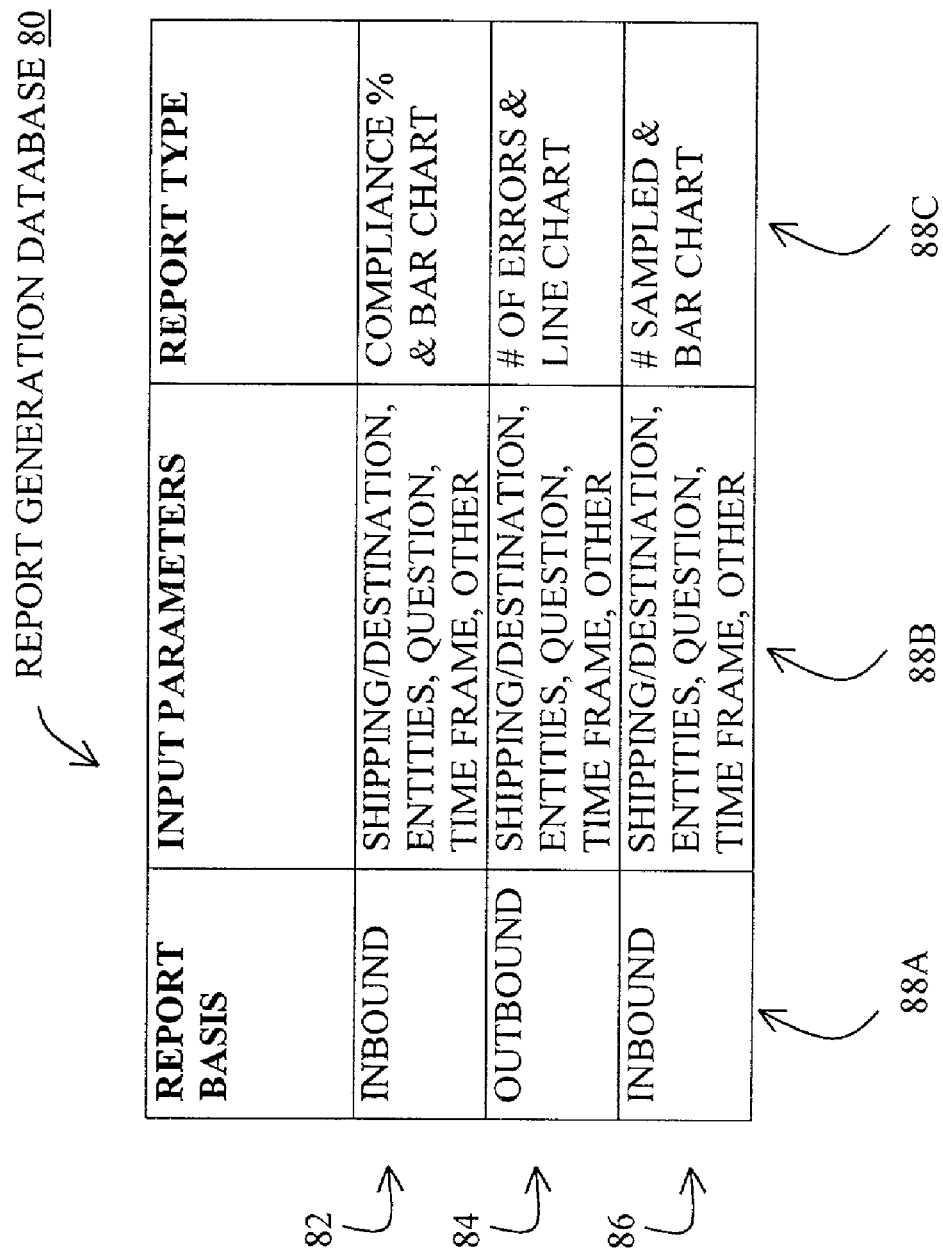
Figure 9:
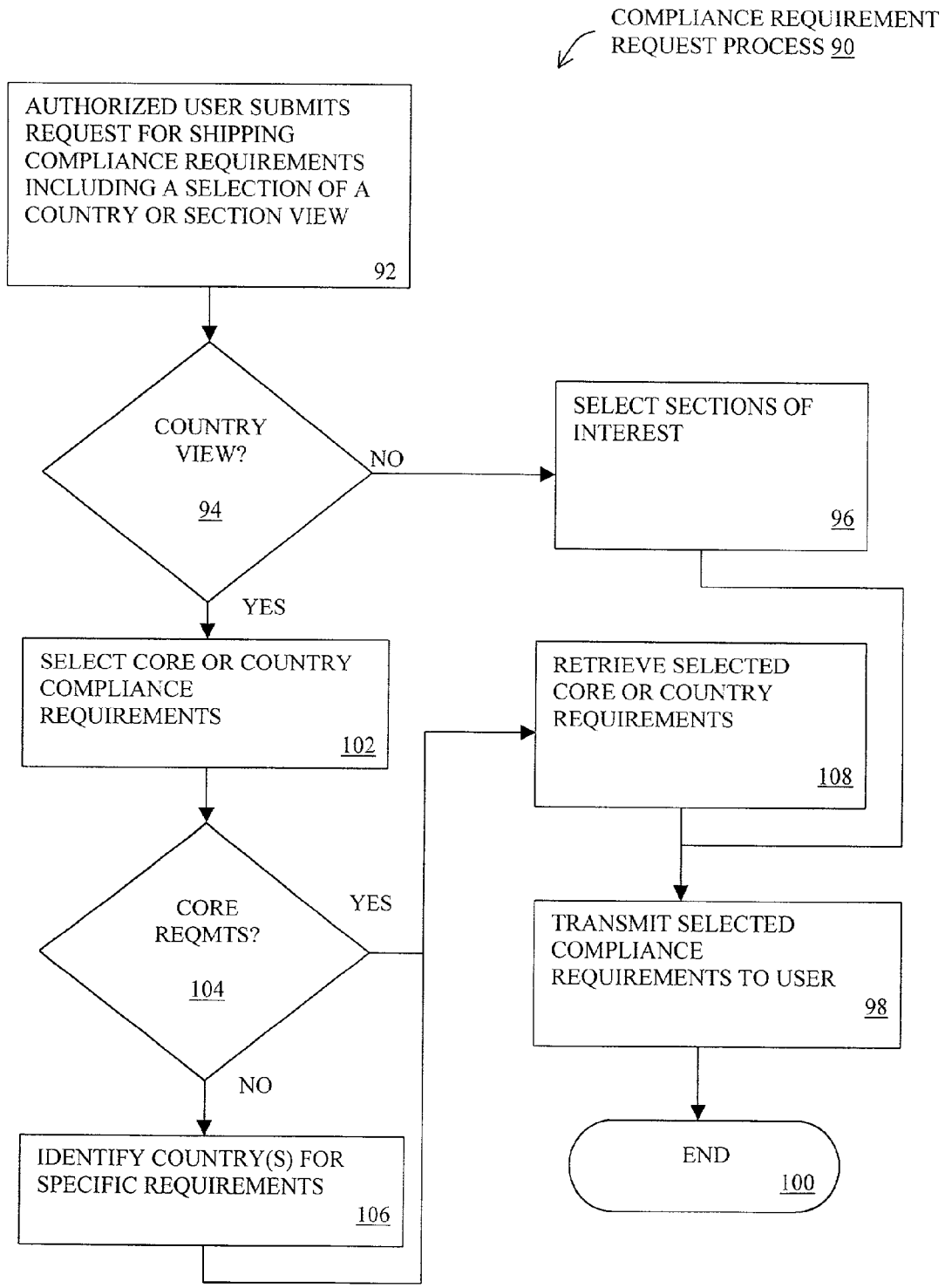
Figure 10:
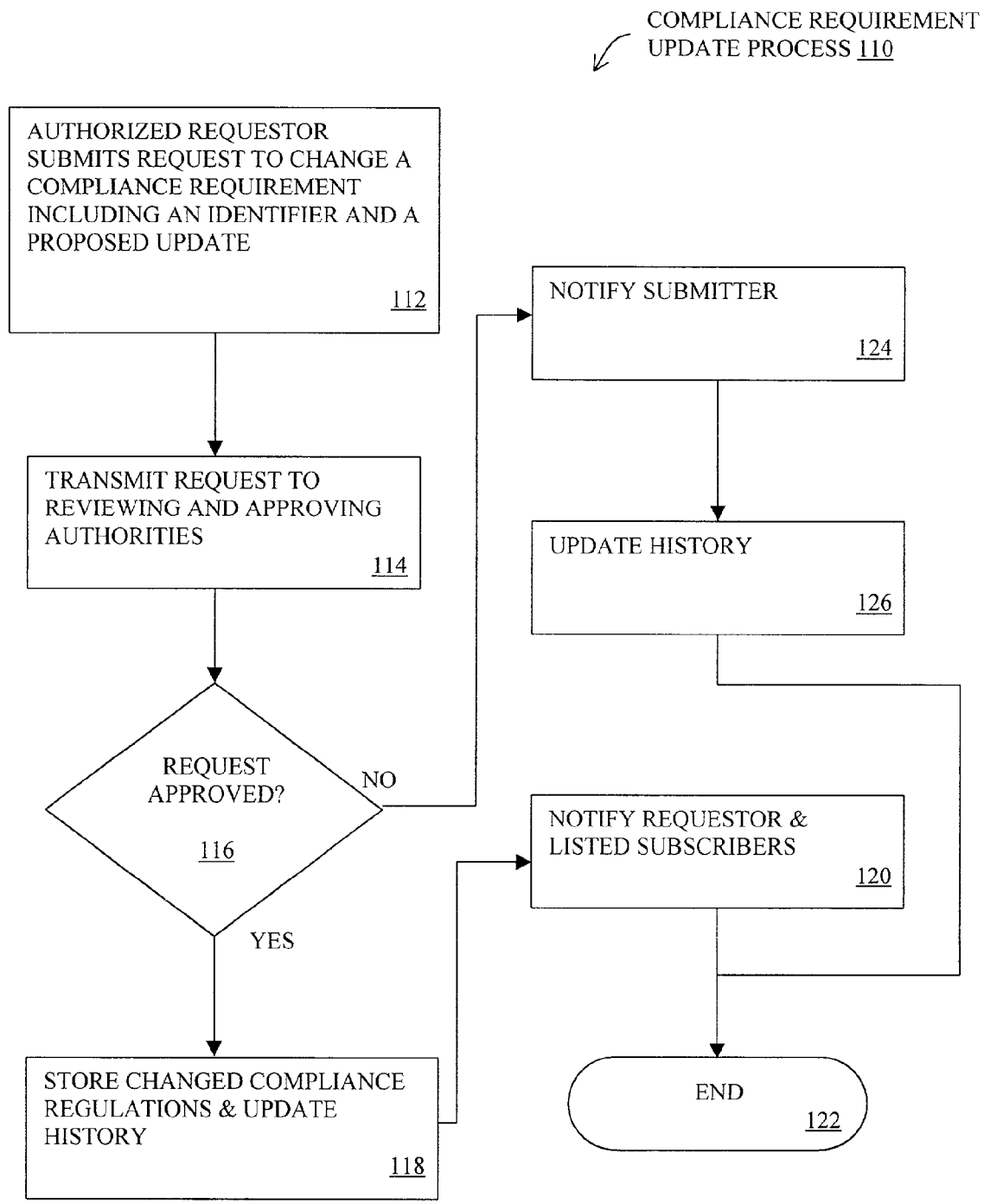
Figure 11:
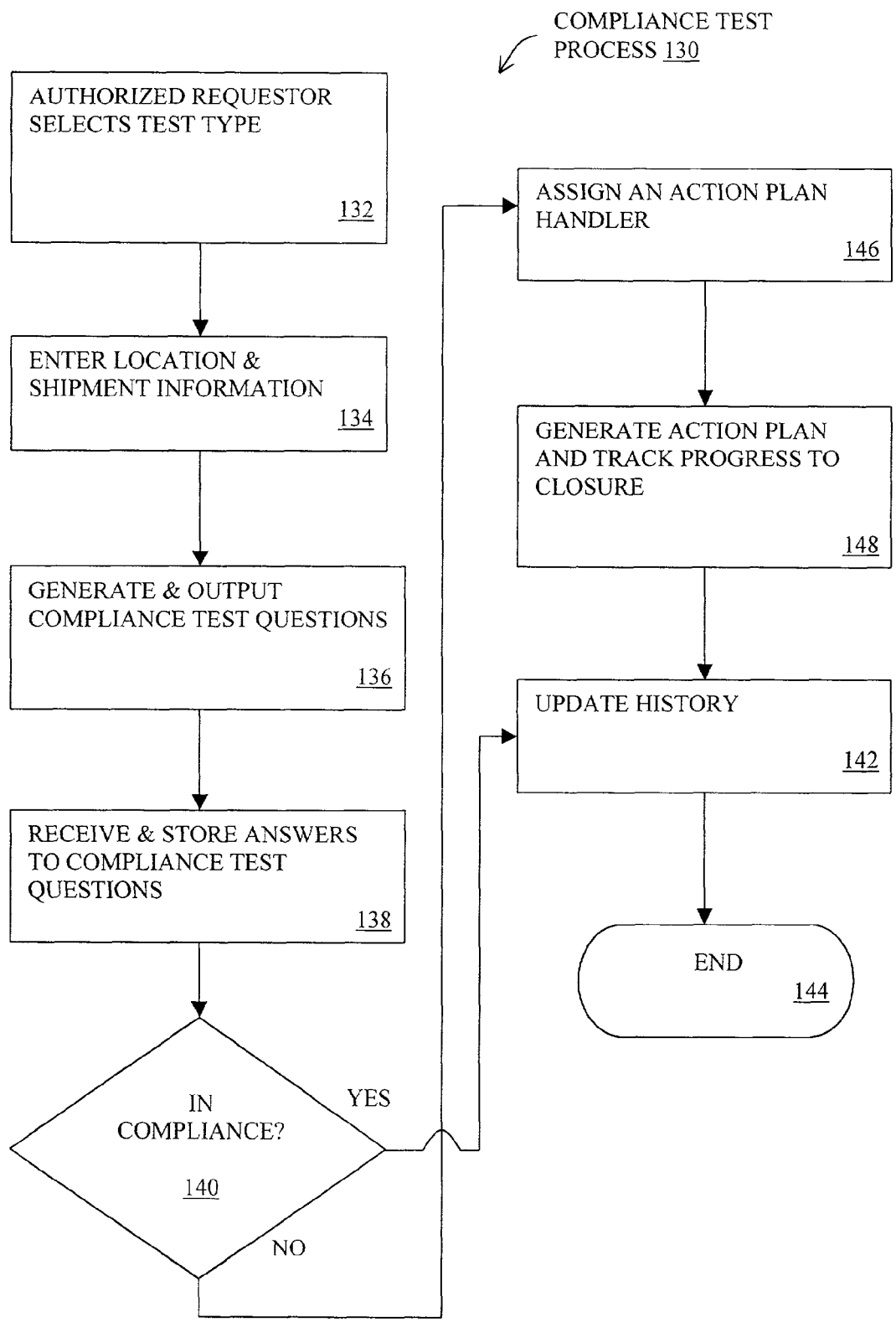

FIGS. 3A and 3B together show a table illustrating an exemplary data structure and contents for a core compliance requirements database;

FIGS. 4A and 4B together show a table illustrating an exemplary data structure and contents for a country-specific requirements database;

FIG. 5 is a table illustrating an exemplary data structure and contents for a requirements update database;

FIGS. 6A and 6B together show a table illustrating an exemplary data structure and contents for a compliance testing database;

FIG. 7 is a table illustrating an exemplary data structure and contents for a country matrix database;

FIG. 8 is a table illustrating an exemplary data structure and contents for a report generation database;

FIG. 9 is a flow chart illustrating a process by which a user obtains compliance requirements using the illustrated system;

FIG. 10 is a flow chart illustrating a process by which an administrator updates compliance requirements maintained in the illustrated system;

FIG. 11 is a flow chart illustrating a process by which a user administers a compliance test using the illustrated system.

Figure 12:
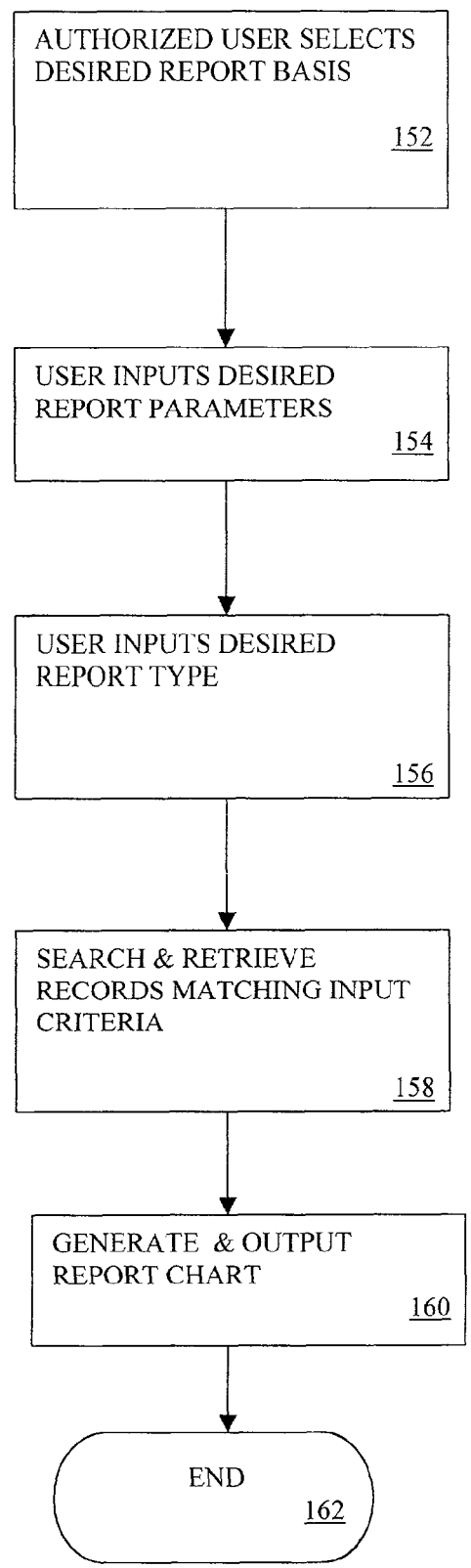
Figure 13:
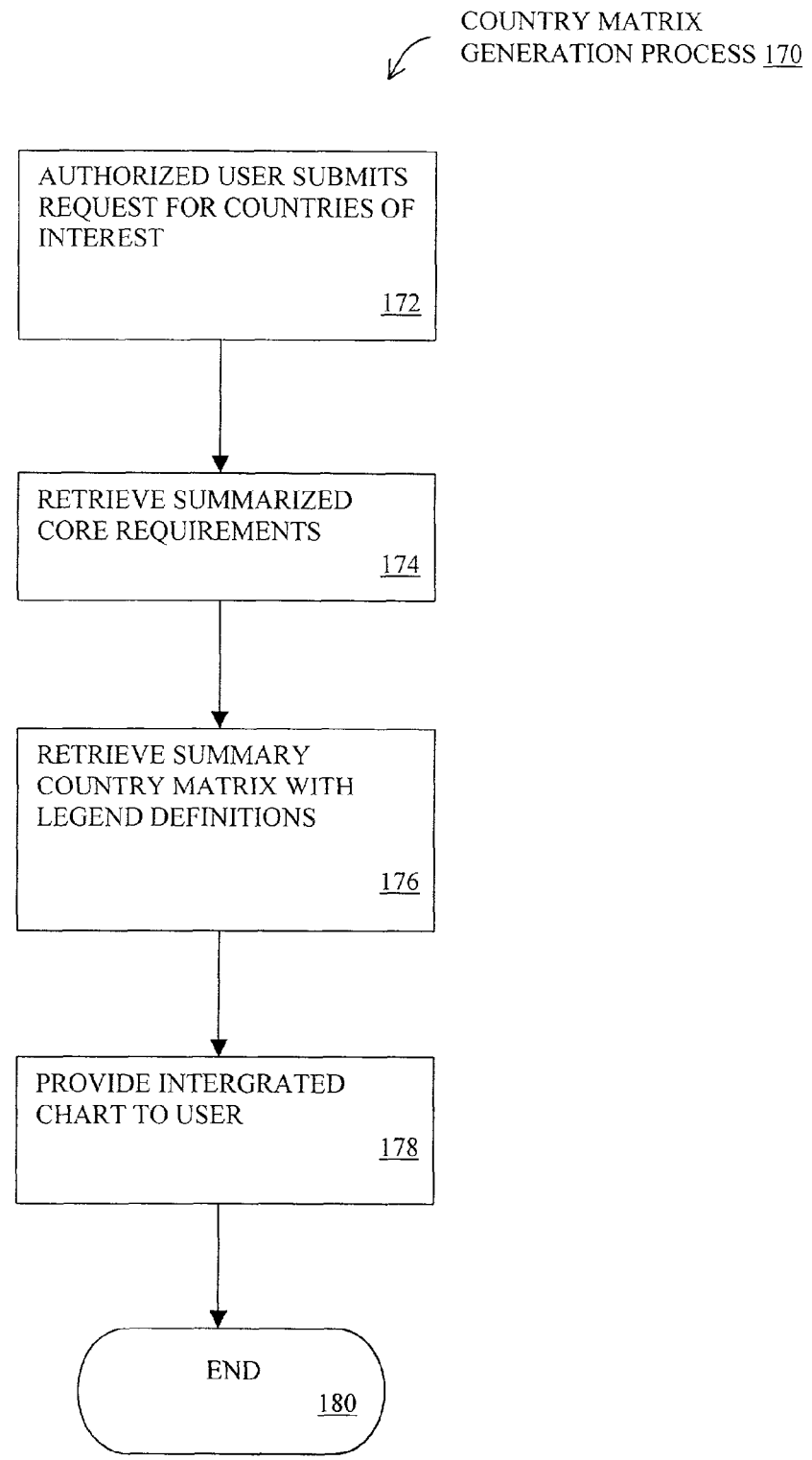

FIG. 12 is a flow chart illustrating a process by which a user obtains a summary matrix of compliance requirements using the illustrated system; and FIG. 13 is a flow chart illustrating a process by which a user generates a compliance report in the illustrated embodiment of the invention.

DETAILED DESCRIPTION OF THE INVENTION

There will now be described, in accordance with the present invention, details of new and improved methods and systems for maintaining user-available requirements for compliance with international shipping guidelines. Features of the invention include centralized control for establishing and changing requirements, the ability to generate core and country-specific requirements in full and matrix/summary format, user-friendly access, compliance monitoring capabilities that enable users to monitor the compliance of actual shipments with the requirements and numerous other functions as will be described below.

The invention will be described first with respect to the system and then with respect to the databases and processes of operation.

Description of the System

Figure 1:
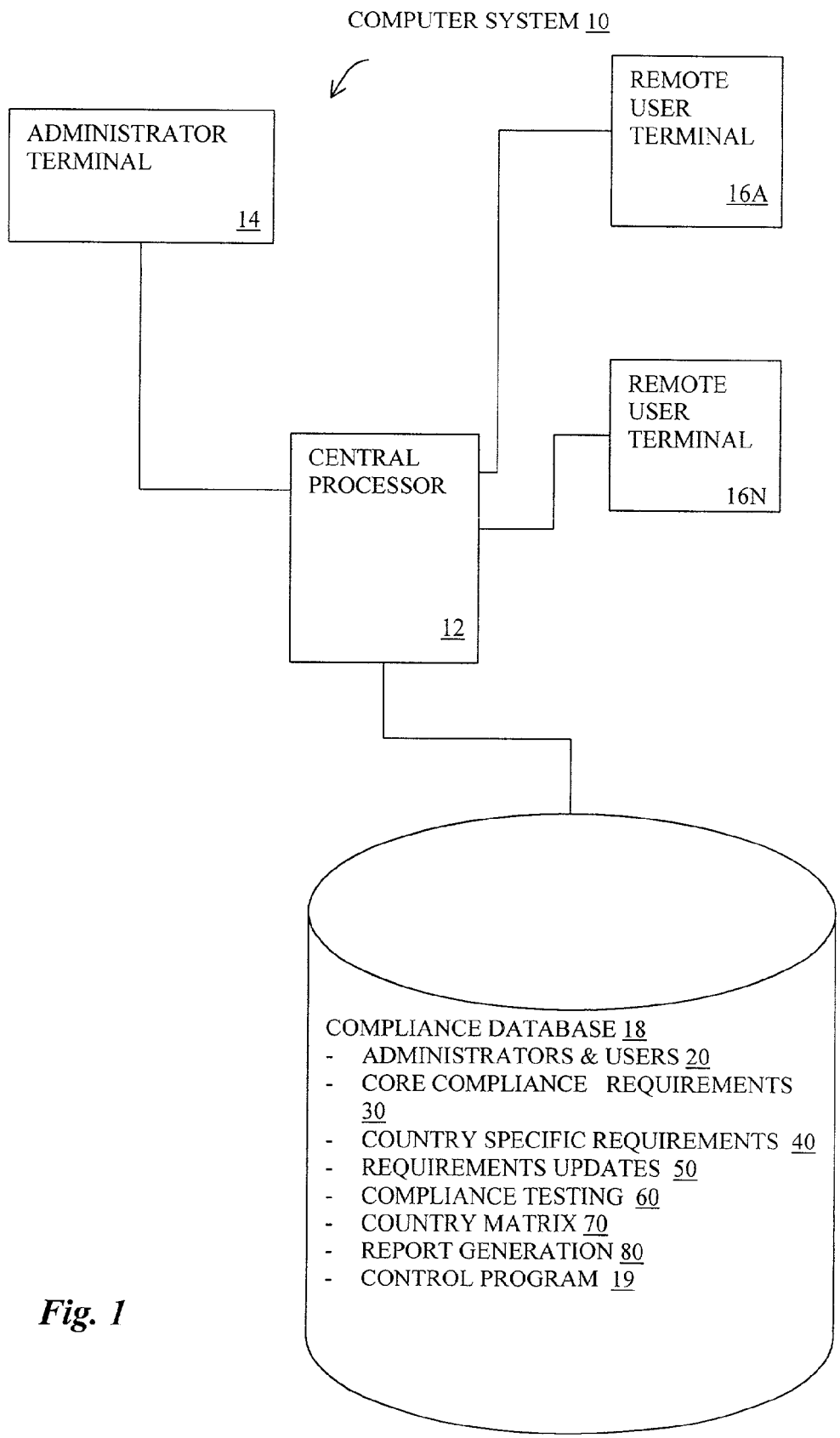
FIG. 1 is a block diagram of a computer system implemented in accordance with the present invention.

With reference now to FIG. 1, there is provided a computer system 10 constructed in accordance with the present invention. System 10 is seen to include a central processor 12, comprising for example a web-based Lotus® Domino® staging server of a type well known in the art. Processor 12 is seen to be connected to an administrator terminal 14 and to a plurality of remote user terminals, indicated at 16A and 16N. Central processor 12 further includes conventional communications ports (not shown) for transmitting and receiving data in the manner described below. Such ports may comprise, for example, conventional modem and/or network connections.

Administrator terminal 14 comprises a conventional input/output device, for example a monitor and keyboard, for inputting data and control information into central processor 12 and for receiving output data therefrom. Similarly, remote user terminals 16A-16N can comprise simple input/output devices or remotely connected computers such as personal computers, servers or mainframe computers connected so as to enable a user to communicate with central processor 12. The interface between the terminals and the central processor is in one embodiment accomplished using a web-based Internet browser, for example Microsoft® Internet Explorer® or Netscape® Navigator®.

Central processor 12 is further seen to be connected to a compliance database 18, the database contained in a conventional storage device comprising an appropriate combination of semiconductor, magnetic and optical memory. The storage device further includes conventional means for inputting and outputting data and control information therefrom (not shown), for example removable disc drives and network connections.

In accordance with the present invention, compliance database 18 is seen to include: an administrators and users database 20, a core compliance requirements database 30, a country specific requirements database 40, a requirements updates database 50, a compliance testing database 60, a country matrix database 70 and a report generation database 80, each of which is described in detail below. Compliance database further includes control programs 19, the operation of which are also described in detail herein below.

As will be seen below, a user interacts with central processor 12 through a remote user terminal 16A-16N, in accordance with the described software control programs and databases, to establish, update, obtain access to and test compliance with international shipping requirements.

Description of the Databases

With reference now to FIG. 2, there is shown an embodiment of the administrators and users database 20, including three data records 22, 24 and 26, each data record including four data fields, the data fields indicated at 28A-28D. Data field 28A contains an access identifier, comprising, for example, a user name, password, cookie identifier or other appropriate indicator identifying a user or administrator of central processor 12. Data field 28B includes a name for the user or administrator. Data field 28C includes an access level indicating whether the record is for a user or administrator. Data field 28D identifies users who have subscribed to receive notices of changes and updates to core and country specific compliance requirements by including a list of requirements to which they subscribe. As will be seen below, administrators and users database 20 is used generally to track users and their administrative or other responsibilities (if any) with respect to the operation of the system.

With reference now to FIGS. 3A & 3B, there is shown the core compliance requirements database 30, including three data records 32, 34 and 36, each data record including nine data fields 38A-38I. Data field 38A contains an international shipment compliance requirement identifier, while data fields 38B and 38C include a section owner and section number, respectively. Section numbers are index numbers associated with requirements which enable numeric tracking and processing. Section owners indicate an administrator responsible for any changes or updates to a particular section. Data field 38D includes a definition or description of that requirement.

For example, core requirements may include: labeling requirements, packaging requirements, warning notice requirements, addressing requirements, and others well known to those skilled in the art.

Continuing with reference to FIGS. 3A&B, data field 38E contains an identity of the originator or creator of the corresponding requirement, while data field 38F contains the date on which that requirement was created. Data field 38G contains a date on which the requirement contained in the corresponding record was last updated or changed, while data field 38H contains the name or other appropriate identifier of the administrator who approved and/or actually entered the change. Data field 38I contains a history of changes and updates made to the core requirement in the corresponding data record, including details of the change and the approving administrator.

As will be seen below, core compliance requirements database is used in developing, tracking and displaying core international shipping requirements.

With reference now to FIGS. 4A&B, the country specific requirements database 40 is shown, including three data records 42, 44, 46, each record containing eleven data fields indicated at 48A-48K. Field 48A is seen to contain a country identifier, preferably the name of the country having specific shipping requirements. Data field 48B contains the geography category where the country resides. Data fields 48C and 48D contain, respectively, the section owner and identifying section number in which the data requirement is indexed. Data field 48E contains the requirement identifier, while data field 48F contains a definition or description of the actual requirement. For example, data record 42 is seen to include a country-specific labeling requirement for Hong Kong, the labeling requirement being a unique coloration for the table.

Continuing with reference to FIGS. 4A&B, data field 48G contains the name of the originator or creator of the compliance regulation, while data field 48H contains the date on which the regulation was initially created. Data field 48I includes the identity of the administrator responsible for coordinating and approving the last update to the requirement, while data field 48J contains the date, if any, on which the corresponding data requirement contained in the record was last updated. Data field 48K includes a history of any changes or updates made to the record. The history can comprise the dates, exact updates or changes and the identity of the authorizing administrator.

As will be seen below, country-specific database 40 is used in developing, maintaining and providing country-specific shipping requirements.

With reference now to FIG. 5, there is shown an embodiment of the requirements updates database 50 including three data records indicated at 52, 54 and 56, each record containing four data fields indicated at 58A-D.

Requirements update database 50 is a collection of all international shipping requirements, both core and country-specific, that are in the process of being updated or otherwise changed. Database 50 may comprise, where appropriate, pointers to or copies of corresponding data in the databases described above.

With reference to database 50, data field 58A comprises the requirement identifier of the requirement undergoing change, including where relevant the section number, while data field 58B contains a definition or description of the change. Data field 58C includes information relating to the date the change was initiated, the date the change was implemented and the name of the requester. Data field 58D contains the status of the proposed change.

As will be seen below, requirements update database is used to facilitate updates and changes to both core and country-specific shipping requirements.

With reference to FIGS. 6A & 6B, there is shown the compliance testing database 60, used in cooperation with the compliance testing process for testing compliance of actual international shipments with requirements in the manner described below. Compliance testing database 60 is seen to include three records 62, 64, 66, each containing eleven data fields indicated at 68A-68K.

Data field 68A contains shipment identifiers indicating the actual international shipment, typically by shipment reference number, for which compliance is being tested. Data field 68B contains a shipment type indicating the shipment as being inbound or outbound so as to select the appropriate compliance test. Data field 68C contains an identifier for the user requesting the test. Data field 68D contains location identifiers identifying the entity performing the test, including the name of the entity performing the test and other identifying information such as a company division, a receiver and the date of receipt of the shipment to be tested. Data field 68E includes a list of core and shipment-specific compliance test questions.

Continuing with reference to FIGS. 6A&B, data field 68F includes the actual answers to the compliance test questions as entered by the user. Data field 68G contains an identifier of the action plan handler responsible for addressing any non-compliance issues resulting from the test. The handler is in one embodiment selected and assigned by the system in accordance with programed rules based on facts particular to a shipment. Data field 68H contains information describing any action plan that may be under consideration, in use, or completed, relating to the compliance testing. Data field 68I contains information relating to any actions actually taken to address action plans arising from compliance testing. Data field 68J contains status information relating to the particular requirement and the action plan described in the corresponding data record. Data field 68K contains a history of all action plan related records.

With reference now to FIG. 7, the country matrix database 70 is shown to include three data records, 72, 74 and 76, each data record containing four data fields indicated at 78A-D. Data field 78A contains summarized core shipping requirements while data field 78B contains the related section into which the requirements are indexed. Data field 78C contains the data for displaying a matrix table showing applicable shipment requirements by country and predetermined compliance section. Data field 78D contains legend code references which constitute links by which a user may call up entire requirement sections. Each legend code constitutes a short description of the applicable requirement accompanied by a section reference to the entire requirement.

As will be seen below, country matrix database 70 is used to provide a summary list, in matrix form, of shipping requirements for one or more user-specified countries.

Considering now FIG. 8, report generation database 80 is seen to include three data records 82, 84 and 86, each data record containing three data fields indicated at 88A-88C. Data field 88A contains a report basis indicating whether the report was created for an inbound or outbound shipping compliance test. Data field 88B contains various input parameters to the report, including but not limited to the shipping and destination entity, the questions set out in the compliance test, the time frame in which the compliance test was complete and other parameters of interest to the report users. Data field 88C contains a report type and data necessary to display the report, for example a percentage compliance report in bar-chart form, a number-of-errors report in line-chart form and other data and report and chart types of interest to the report user that will now be apparent to the reader.

As will be seen below, report generation database 80 is used to generate reports relating to compliance issues so that system administrators can determine, amongst other things, problem areas with respect to international shipping and/or the documented requirements.

Description of the Processes

Preregistration of Users

System user access is established by a preregistration process (not shown) using a commercially available authentication and authorization tool, many of which are known in the art. See, for example, JAAS® by Java® or the various authentication and authorization products available from Microsoft®. Once registration is completed, in accordance with the operation of the commercial tool, the system administrator loads the user identities into administrators and users database 20 which governs system functions and the user is enabled to access the various system functions described below.

Compliance Request Process

With reference now to FIG. 9, a compliance requirement request process 90 is shown whereby a user can request compliance information for a particular planned international shipment.

To initiate the process, a user logs onto central processor 12 through a remote user terminal 16A-N and submits a request for international shipping compliance requirements (step 92). The user selects between a country view of country requirements and a section view of section requirements (step 94). A section view may be selected, for example, if a user desires to see every indexed requirement relating to a particular compliance requirement section, for example every compliance requirement in the section relating to labeling. If the section view is selected (i.e. not the country view (step 94)), the user selects compliance requirement sections of interest (step 96) which are subsequently transmitted to the user (step 98). The process then ends (step 100).

If the user selects to receive country requirements (step 94), then the user next selects between receiving core requirements for all countries and country specific requirements (step 104). If the user selects core requirements, then they are retrieved (step 108) and transmitted to the user (step 98). If the user selects to receive country-specific requirements, then he selects the country(s) for which he desires the compliance requirements (step 106). The country-specific requirements are then retrieved from storage (step 108) and transmitted to the user (step 98). The process then ends (step 100).

It will be appreciated that, for example, a user may select to receive core requirements if he desires to access requirements for a given section that applies to all countries, while a user may select a country view to determine the unique requirements necessary to execute a shipment to one or more specific countries.

Compliance Requirement Update Process

With reference now to FIG. 10, there is shown a compliance requirement update process 110 by which compliance requirements can be updated, changed, canceled or otherwise amended.

The process is initiated by the submission of a request to change a compliance requirement. Such a request is submitted by an authorized user to processor 12 through a remote user terminal 16A-16N. The request includes an identifier of the requester as well as details on the proposed change (step 112). The requirement change request is transmitted to an appropriate reviewing and approving authority(s) (step 114) determined by a lookup in the administrator and user database 20 to determine the responsible administrator.

The proposed change is reviewed by the appropriate approving authorities. This may be done online, off-line, through meetings or in any appropriate manner, and an approval or disapproval is returned into system 10 (step 116). If the request to change the compliance requirement is approved, the changed compliance requirement is stored in the appropriate core or country specific compliance requirement database and the corresponding history data field is updated to reflect the change (step 118). The submitter, and other users subscribing to change notifications as identified in administrators and users database 20, are notified that the change is complete (step 120) and the process ends (step 122).

If the request is rejected (step 116), the submitter is notified (step 124), the history records are updated to reflect the rejection (step 122) and the process ends.

International Shipment Testing Process

With reference now to FIG. 11, there is shown a compliance test process 130 for testing the compliance of an actual, user-selected international shipment with the international shipping requirements applicable to that particular shipment. The process operates in particular cooperation with compliance testing database 60, data being populated into or retrieved from the database in accordance with the process steps set out below.

To initiate the process, an authorized user selects the test type (step 132), particularly whether the test is for an inbound or outbound shipment, and enters the location country and shipment information (step 134), all through a remote user terminal 16A-N. Shipment-specific information includes, for example and without limitation, origination and destination countries, shipment content information and document control numbers.

Compliance test questions are generated by the system, dependent on the input information relating to the international shipment under test (step 136). The questions are output to the user (step 136) and answers to the test questions are received from the user and stored in compliance testing database 60 (step 138).

All questions are of the "Yes/No" answer type. The evaluation of answers is automated in accordance with programmed rules. "Yes" answers to test questions indicate compliance with the shipping requirements, while "No" answers indicate noncompliance. The answers received from the user are tested for compliance (step 140). If the answers indicate that the shipment is in compliance with requirements, then the appropriate record in compliance testing database 60 is completed with the completion of the history field indicating compliance (step 142) and the process ends (step 144).

If a noncompliance condition exists for any of the test questions, the system will assign an action plan handler (step 146) from amongst the list of users identified as appropriate action plan handlers in administrators and users database 20. The system will also generate an action plan request under which the handler will oversee the creation of an action plan and oversee the completion of that action plan until closure (step 148). Upon the completion of the action play, the record including the history file in compliance testing database 60 is updated (step 142), the action plan is closed and the process will end (step 144).

The system accepts "Not Applicable" responses to test question in lieu of a "Yes" or "No," but requires a reason be entered by the user in support of the response. Such an answer/reason will be considered by a handler in determining if an action plan is necessary.

As noted above, compliance tests are generally created by the system in accordance with rules and consist of simple yes/no questions to indicate whether requirements have been met. Action plans are generally created manually be the action plan handler and include subjective actions relevant to a particular noncompliance matter.

For purposes of illustrating the testing process described above, it will be assumed that a user requests a compliance test for an international shipment of a food product from originating country A to destination country B. The user requests a test and compliance questions are generated in accordance with: the core compliance requirements and the country-specific requirements for countries A and B, all as particularly relating to food products (if any such particular requirements exist).

The system will generate a list of test questions based on the compliance requirements. Test questions will be simple and in "yes" "no" format. The questions will be simple queries as to whether the requirements have been met, for example:

Is the shipment wrapped in plastic?

Is the shipment appropriately marked as containing a food product?

Other appropriate questions will be apparent based on the relevant shipping requirements.

Assuming that the answer to the first question is yes, but the answer to the second question is no, the system will indicate that the test has been failed and the status will show the test is pending. The system will identify a handler and notify the handler of the necessity for an action plan. The handler will create an action plan directed to solving the particular noncompliance problem and more broadly to solve any larger problems of which the test results are indicative. Subsequently the history will be updated to show the creation of the action plan, actions taken to address the issues, and the status will show as "closed."

Compliance Report Generation

With reference now to FIG. 12, a compliance test report generation process 150 is shown whereby an authorized user can request a report of selected compliance testing results. The process works in particular cooperation with report generation database 80, storing and retrieving information from the database as per the process steps.

To initiate the process, an authorized user logs onto central processor 12 through a user terminal 16A-N and submits a request for a desired compliance report basis, i.e. inbound or outbound shipment (step 152). The user enters desired report parameters (step 154) and indicates the type of report format desired (step 156). Report parameters include, for example and without limitation: the shipping and destination entity, shipment time frame, type of goods shipped, noncompliance issues, etc. The report format is typically one of a standard type, such as a bar or line chart.

The system searches compliance testing database 60 and retrieves records that match the user-supplied report parameters (step 158). A report including a chart is then generated and outputted to the requester (step 160) and the process ends (step 162). The report chart, of the type selected by the user, shows the search results statistically. Also provided are a detailed listing of all compliance test records on which the report was based. Means such as a hyper link or other appropriate data are provided for enabling the user to retrieve and examine the entirety of any selected, reported test record(s).

Country Matrix Generation Process

With reference now to FIG. 13, there is shown a country matrix generation process 170 whereby a user can request a summary matrix of key shipping requirements for selected countries. The process works in particular cooperation with country matrix database 70, storing and retrieving information from the database as per the process steps.

To initiate the process, an authorized user logs onto central processor 12 through a remote user terminal 16A-N and submits a request for the countries of interest (step 172).

The system retrieves summary core requirements from country matrix database 70 (step 174) and produces a matrix report including legend codes (step 176), the legend codes applicable to each of the selected countries for various types of predefined requirements categories. The information is output to the user in a matrix chart format (step 178) and the process ends (step 180).

The contents of the country matrix database 70 are determined by a system administrator as a function of the contents of the core compliance database 30 and the country specific requirements database 40 to assist the user of the matrix chart in obtaining a good overview of the requirements. The system administrator optionally updates country matrix database 70 as the contents of the core compliance database 30 and country-specific requirements database 40 change.

Additional Features

The present invention includes additional features to facilitate its operation, including but not limited to: a full search capability by which a user can search core requirements database 30 and country-specific database 40, a coordinator listing function by which a user can receive a list of key process administrators responsible for operating, maintaining and updating the system, comprehensive administration functions facilitating the maintenance and update of the various databases and processes and attachment functions enabling users to attach varied file types to various databases.

There have thus been described new and improved systems and processes for facilitating the compliance of international shipments with international shipment requirements. The invention provides centralized control of the establishment of and changes to the compliance requirements. User-friendly access to requirement information is provided, including country information in summary matrix format. A compliance test process is provided for testing the compliance of actual shipments with shipment requirements. The invention has general application to all industries performing international shipments.

What is claimed is:

1. A method operable on a computer for distributing requirements to facilitate international shipping, comprising the steps of:
   storing on said computer core requirements applicable to a plurality of countries;
   storing on said computer respective country-specific requirements applicable to respective countries;
   receiving a request from a requester for requirements for one or more selected countries;
   determining if country-specific requirements are stored on said computer for said one or more selected countries;
   providing said core requirements to said requester; and
   providing, if country-specific requirements are stored on said computer for said one or more countries, said country-specific requirements to said requester wherein said step of receiving a request comprises receiving a request for requirements for a plurality of countries; and further including the steps of:
   determining if respective country-specific requirements are stored on said computer for respective ones of said plurality of countries;
   providing, if respective country-specific requirements are stored on said computer for respective ones of said plurality of countries, said respective country-specific requirements to said requester.

2. A method operable on a computer for distributing requirements to facilitate international shipping, comprising the steps of:
   storing on said computer core requirements applicable to a plurality of countries;
   storing on said computer respective country-specific requirements applicable to respective countries;
   receiving a request from a requester for requirements for one or more selected countries;
   determining if country-specific requirements are stored on said computer for said one or more selected countries;
   providing said core requirements to said requester; and
   providing, if country-specific requirements are stored on said computer for said one or more countries, said country-specific requirements to said requester and further including the step of providing said core requirements and said respective country-specific requirements in a matrix chart format.

3. A system for distributing requirements to facilitate international shipping, comprising:
   a processor;
   a memory operatively connected to said processor and storing instructions for controlling the operation of said processor to perform the steps of:
   storing core requirements applicable to a plurality of countries;
   storing respective country-specific requirements applicable to respective countries;
   receiving a request for requirements for one or more selected countries;
   determining if country-specific requirements are stored for said one or more selected countries;
   providing said core requirements to said requester; and
   providing, if country-specific requirements are stored for said one or more selected countries, said country-specific requirements to said requester wherein said step of receiving a request comprises receiving a request for requirements for a plurality of countries; and further including the steps of:

determining if respective country-specific requirements are stored for respective ones of said plurality of countries;

providing, if respective country-specific requirements for respective ones of said plurality of countries, said respective country-specific requirements to said requester.

4. A system for distributing requirements to facilitate international shipping, comprising:

a processor;

a memory operatively connected to said processor and storing instructions for controlling the operation of said processor to perform the steps of:

storing core requirements applicable to a plurality of countries;

storing respective country-specific requirements applicable to respective countries;

receiving a request for requirements for one or more selected countries;

determining if country-specific requirements are stored for said one or more selected countries;

providing said core requirements to said requester; and providing, if country-specific requirements are stored for said one or more selected countries, said country-specific requirements to said requester and further including the step of providing said core requirements and said respective country-specific requirements in a matrix chart format.

5. A method operable on a computer of obtaining international shipping requirements, comprising the steps of:

requesting, on said computer, international shipping requirements for one or more selected countries;

receiving, on said computer, core international shipping requirements applicable to a plurality of countries;

receiving, on said computer, an indication of respective country-specific requirements available for said one or more selected countries; wherein said requesting step includes requesting, on said computer, international shipping requirements for a plurality of selected countries; and further comprising the steps of receiving, on said computer, said core requirements and, if respective country-specific requirements are available for one or more of said plurality of selected countries, said respective country-specific requirements.

6. A method operable on a computer of obtaining international shipping requirements, comprising the steps of:

requesting, on said computer, international shipping requirements for one or more selected countries;

receiving, on said computer, core international shipping requirements applicable to a plurality of countries;

receiving, on said computer, an indication of respective country-specific requirements available for said one or more selected countries; wherein said core and said respective country-specific requirements are received in a matrix chart format.

7. A system for obtaining international shipping requirements, comprising:

a processor;

a memory connected to said processor and storing instructions to control the operation of said processor to perform the steps of:

requesting international shipping requirements for at least one selected country;

receiving core international shipping requirements applicable to a plurality of countries;

receiving an indication of respective country-specific requirements available for said at least one selected country; and receiving, if respective country-specific requirements are available for said selected country, said respective country-specific requirements, wherein said requesting step includes requesting international shipping requirements for a plurality of selected countries; and further comprising the steps of receiving said core requirements and, if respective country-specific requirements are available for one or more of said plurality of selected countries, said respective country-specific requirements.

8. A system for obtaining international shipping requirements, comprising:

a processor;

a memory connected to said processor and storing instructions to control the operation of said processor to perform the steps of:

requesting international shipping requirements for at least one selected country;

receiving core international shipping requirements applicable to a plurality of countries; and receiving an indication of respective country-specific requirements available for said at least one selected country, wherein said core and said respective country-specific requirements are received in a matrix chart format.

9. A method operable on a computer for distributing requirements to facilitate international shipping, comprising the steps of:

storing on said computer core requirements applicable to a plurality of countries;

storing on said computer respective country-specific requirements applicable to respective countries;

storing on said computer country-specific summary requirements corresponding to said country-specific requirements;

receiving a request for a summary report of requirements for at least one selected country;

determining if country-specific requirements are stored on said computer for said at least one selected country; and providing, if country-specific requirements are stored on said computer for said at least one country, said country-specific summary requirements to said requester, wherein said country-specific summary requirements are provided in a matrix chart format.

10. A method operable on a computer for distributing requirements to facilitate international shipping, comprising the steps of:

storing on said computer core requirements applicable to a plurality of countries;

storing on said computer respective country-specific requirements applicable to respective countries;

storing on said computer country-specific summary requirements corresponding to said country-specific requirements;

receiving a request for a summary report of requirements for at least one selected country;

determining if country-specific requirements are stored on said computer for said at least one selected country; and providing, if country-specific requirements are stored on said computer for said at least one country, said country-specific summary requirements to said requester, wherein said country-specific summary requirements are provided in a matrix chart format and further including the steps of:

storing on said computer core summary requirements corresponding to said core requirements; and providing said core summary requirements to said requester in said matrix chart format.

11. A system for distributing requirements to facilitate international shipping, comprising:

a processor;

a memory connected to said processor and containing instructions for controlling the operation of said processor to perform the steps of:

storing core requirements applicable to a plurality of countries;

storing respective country-specific requirements applicable to respective countries;

storing country-specific summary requirements corresponding to said country-specific requirements;

receiving a request for a summary report of requirements for at least one selected country;

determining if country-specific requirements are stored for said at least one selected country; and providing, if country-specific requirements are stored for said at least one country, said country-specific summary requirements to said requester, wherein said country-specific summary requirements are provided in a matrix chart format.

12. A system for distributing requirements to facilitate international shipping, comprising:

a processor;

a memory connected to said processor and containing instructions for controlling the operation of said processor to perform the steps of:

storing core requirements applicable to a plurality of countries;

storing respective country-specific requirements applicable to respective countries;

storing country-specific summary requirements corresponding to said country-specific requirements;

receiving a request for a summary report of requirements for at least one selected country;

determining if country-specific requirements are stored for said at least one selected country; and providing, if country-specific requirements are stored for said at least one country, said country-specific summary requirements to said requester, wherein said country-specific summary requirements are provided in a matrix chart format and further including the steps of:

storing core summary requirements corresponding to said core requirements; and providing said core summary requirements to said requester in said matrix chart format.

* * * * *